United States Patent [19]

Grodzinsky et al.

[11] 4,236,985
[45] Dec. 2, 1980

[54] METHOD FOR MACHINING WORKS OF CURRENT-CONDUCTING MATERIAL WITH CURRENT-CONDUCTING ABRASIVE TOOLS

[76] Inventors: Eduard Y. Grodzinsky, ulitsa Marii Ulyanovoi, 11, kv. 117; Roalda B. Isakova, ulitsa Vavilova, 70, korpus 3, kv. 237; Lidia S. Zubatova, ulitsa Ljublinskaya, 111, stroenie 1, kv. 120; Anna T. Makonovitskaya, ulitsa Malysheva, 19, kv. 288; Aron K. Grinberg, ulitsa Dorozhnaya 34, kv. 25, all of Moscow, U.S.S.R.

[21] Appl. No.: 35,096

[22] Filed: May 1, 1979

[30] Foreign Application Priority Data

May 3, 1978 [SU] U.S.S.R. .............................. 2607711

[51] Int. Cl.$^3$ ..................... B23P 1/04; B23P 1/10; C25F 3/02; C25F 7/00
[52] U.S. Cl. ..................... 204/129.43; 204/129.46; 204/DIG. 9; 219/69 V; 219/69 M; 219/69 P
[58] Field of Search ............ 204/129.46, DIG. 9, 204/129.6, 129.75, 129.43, 144.55; 219/69 V, 69 M, 69 P

[56] References Cited

U.S. PATENT DOCUMENTS

| | | | |
|---|---|---|---|
| 2,905,605 | 9/1959 | Keeleric et al. | 204/129.43 |
| 3,851,135 | 11/1974 | Moracz et al. | 219/69 M |
| 4,013,526 | 3/1977 | Inoue | 204/129.46 |
| 4,125,444 | 11/1978 | Inoue | 204/129.43 |

Primary Examiner—John H. Mack
Assistant Examiner—D. R. Valentine
Attorney, Agent, or Firm—Lackenbach, Lilling & Siegel

[57] ABSTRACT

The invention is applicable to the griding with current-conducting abrasive tools of works of current-conducting churlish materials, such as hard, magnetic and refractory alloys, and to cutter sharpening.

The method according to the invention consists in applying voltage pulses to a tool and a work placed in a liquid medium with a conductance of $10^{-4}$ to $2 \cdot 10^{-2}$ ohm$^{-1}$·cm$^{-1}$.

The process of grinding the work and electric-erosion cleaning the tool is carried out at a pulse duration of 0.5 to 10 msec, pulse repetition frequency of 10 to 500 Hz, and amplitudie of pulses ranging from a minimum of 3 V to a maximum which is below a level required for a breakdown of the liquid medium between the tool and the work.

Alternatively, simultaneously with machining the work the electric-erosion truing of the tool is performed with the use of a tool truing electrode.

The tool truing electrode and the work are connected to the same pole of a power source.

According to an alternative embodiment, the truing electrode is a nozzle intended to direct a liquid medium into the machining zone.

2 Claims, 1 Drawing Figure

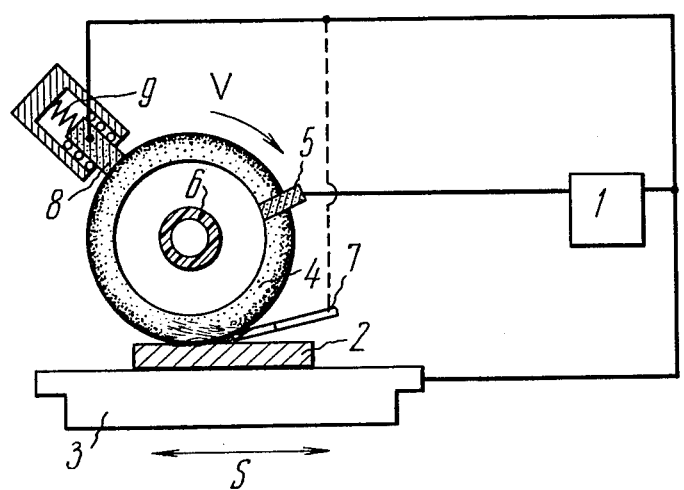

METHOD FOR MACHINING WORKS OF CURRENT-CONDUCTING MATERIAL WITH CURRENT-CONDUCTING ABRASIVE TOOLS

FIELD OF THE INVENTION

The present invention relates to the uses of conducting material-bonded abrasives, including diamond and boron nitride abrasives, for grinding operations involving the application of voltage pulses to the tool and the work and, more particularly, to a method for machining works of current-conducting materials with current-conducting abrasive tools.

The invention is best applicable to flat surface and cylindrical grinding, including internal cylindrical grinding, of hard-to-work materials, such as hard, magnetic and refractory alloys; the invention is also applicable to cutter grinding.

BACKGROUND OF THE INVENTION

The rapid growth of electronics, as well as aircraft, automotive and other industries, requires an increasing supply of high-quality metals and alloys, such as tungsten, zirconium, and hard, magnetic and refractory alloys, stainless steels. This trend is accompanied by imposing increasingly stringent requirements on articles of such materials, the chief requirement being that the surface layers of articles should be free from defects, such as microcracks, burns and indentations. In view of the high hardness, viscosity or brittleness of the above-mentioned materials, conventional grinding turns out to be a laborious process which is invariably marked by rapid wear of the abrasive tools. Electrolytic grinding is more effective, but its applications are limited by a number of factors. First, electrolytic solutions tend to corrode the equipment, thereby requiring the critical parts to be made of expensive stainless steel. Second, some metal is dissolved in and reacts with the electrolyte to form hydroxide, which adds to the overall losses of metal; the purification of the electrolyte and the recovery of metal therefrom prove to be laborius processes; and one also has to use big-sized tanks for the electrolyte and complement the equipment with such accessories as centrifuges, settling tanks, etc. Third, electrolytic grinding is a power-consuming process, to say nothing of the difficulties involved in applying heavy current to the tool and the work. Finally, electrolytic grinding requires expensive and cumbersome equipment which is hard to service.

The above disadvantages are eliminated in the grinding process according to USSR Inventor's Certificate No. 494,130 of 1976, Cl. B 23 P 1/10, whereby grinding is carried out with the use of a current-conducting diamond tool in a liquid medium with a conductance of $10^{-4}$ to $2 \cdot 10^{-2}$ ohm$^{-1}$ · cm$^{-1}$ and is accompanied by producing electric discharges between the wheel and the work. The discharges serve several purposes. First, they help to avoid the glazing of the tool. Second, they remove the external layer of the current-conducting binder, whereby fresh grains are brought to the wheel's surface. Third, the electrothermal action on the surface of the work is claimed to make the microcutting easier.

An electric discharge is, in fact, a breakdown of the dielectric between the tool and the work, whereafter current reaches both through the freshly formed discharge channel (cf. A. L. Livshits et al., "Electroimpulsnaya obrabotka metallov" /"Electric Pulse Working of Metals"/, Machinostroyeniye Publishers, Moscow, 1967, p. 27, lines 3–5 from the top).

According to USSR Inventor's Certificate No. 494,130, a pulse generator is used to apply voltage pulses to the electrodes, wherein the tool is the anode and the work is the cathode. The parameters of the spark discharges in the dielectric-filled gap between the electrodes are as follows: frequency, 8 to 440 kHz; on-off time ratio, 1.25 to 5; pulse duration, 1.0 to 100 microseconds; and voltage amplitude, 65 to 200 V.

However, the above method also has its drawbacks. First, it necessitates the use of quite complicated, unreliable in operation, and costly high-frequency pulse generators. Second, the substantial drop of output voltage of such generators at a low load resistance accounts for limited applications of the process.

The latter disadvantage stems from the very principle on which the process under review is based. The high-voltage, high-frequency pulse generators intended to produce spark discharges in the working zone are designed for operation in media possessing a high dielectric strength, such as oil, kerosene, liquid hydrocarbons, etc. On the other hand, such media cannot be used in grinding because of fire hazards. Of course, cutting fluids and 3% soda solution can serve the purpose, but one has to keep in mind that these are aqueous solutions and extremely weak electrolytes. Because of this and due to the presence of chips in the working zone, the resistance of the interelectrode gap is quite low, which accounts for a considerable drop of voltage at the output of the generator. An increase of the area of contact between the tool and the work or an attempt to boost the machine tend to further reduce the voltage level at the generator output and may eventually discontinue the electro-erosion process. According to experiments, the method under review is applicable to tool grinding operations only if the area of contact between the wheel and work is not greater than 2 to 2.5 cm$^2$ and if the wheel infeed is not in excess of 5 mm/min. It would seem that the problem could be solved by changing construction of pulse generators. However, this would mean using more complicated, bulky and costly generators, wherefore the process would be altogether uneconomical.

In a number of cases, truing is carried out outside the machining zone by means of electro-erosion. This type of truing, however, leads to an erosion and mechanical wear of the truing electrode.

SUMMARY OF THE INVENTION

It is an object of the present invention to raise the grinding speed and maintain it at a high level irrespective of the area of contact between the tool and the work.

It is another object of the invention to simplify the design, reduce the size and improve the reliability of the pulsed voltage source.

It is a further object of the invention to improve the stability of the grinding process.

It is a still further object of the invention to facilitate maintenance of the grinding equipment.

Finally, it is an object of the invention to reduce the wear of the tool truing electrode.

The foregoing and other objects of the present invention are attained by providing a method for machining works of current-conducting materials with current-conducting abrasive tools to be carried out in a liquid medium with a conductance of $10^{-4}$ to $2 \cdot 10^{-2}$ ohm$^{-1}$.

cm$^{-1}$, whereby voltage pulses are applied to the tool and the work. The invention is characterized in that the machining is done at a pulse duration of 0.5 to 10 msec, a pulse repetition frequency of 10 to 500 Hz and an amplitude of pulses ranging from a minimum of 3 V to a maximum which is below a level required for a breakdown of the liquid medium between the tool and the work.

Unlike the conventional methods, the method according to this invention ensures a high efficiency regardless of the area of contact between the tool and the work and makes it possible to employ simpler, smaller and cheaper pulsed voltage sources.

The above-mentioned pulse voltage parameters ensure effective truing of the wheel and melting of chips in the machining zone within a broad range of infeed rates and areas of contact between the tool and the work. Variations of these parameters are bound to lead to an impermissibly rapid wear of the tool, which is the case when higher-power pulses are used, or to gradually reduce the cutting capacity of the tool and hence efficiency of machining, which is the case when lower-power pulses are used.

The method of this invention has been evolved on the basis of extensive research and tested under actual production conditions. It has been established that electric discharges between the electrodes are not the only way to deglaze a tool; the same object can be achieved by using the break arc produced as a result of a breaking of microcontracts between the electrodes (cf. A. L. Livshitz et al., "Electroimpulsnaya obrabotka metallov"/"Electric Pulse Working of Metals"/, Machinostroyeniye Publishers, Moscow, 1967, p. 27, lines 13–16 from the top).

The use of break arcs instead of spark discharges for erosion cleaning of the tool makes it possible to reduce the maximum voltage amplitude from as high as 65 to 200 V to as low as 2 to 50 V; reduce the pulse repetition frequency from as high as 8 to 200 kHz to as low as 3 to 500 Hz; and replace high-frequency pulse generators by less sophisticated and more efficient power sources.

The point contacts between the electrodes are periodically closed and broken due to the rotation of the tool and by the chips as these are melted by short-circuit currents. According to the invention, the application of voltage to the electrodes is effected periodically, i.e. in the form of pulses, which minimizes the tool wear. Depending on the properties of the material to be worked, as well as wheel characteristics and grinding conditions, the duration of pulses is varied between 0.5 and 10 msec, whereas the pulse repetition frequency is selected within the range of 10 to 500 Hz.

The electro-erosion cleaning of the tool from chips and opening of the fresh grains in the work machining zone may become insufficient. In such a case according to an alternative embodiment of the invention simultaneously with machining the work an electro-erosion truing of the tool is carried out outside the machining zone by means of an electrode by supplying voltage pulses of the above-mentioned parameters to the work, the tool and the tool truing electrode.

The truing of the tool can only be carried out if there are chips on the tool surface. This results in the truing is quite effective, and the tool wear being reduced.

It is expedient that the force with which the truing electrode is pressed against the tool should be such as to enable the electrode to slide over the tool.

Meeting this requirement helps to reduce the mechanical wear of the electrode and accounts for a situation where the truing can only be done under certain conditions. No electric contact between the electrode and the tool, i.e. wheel, takes place and no erosion process occurs in the truing zone if the surface of the wheel is not loaded. However, erosion recommences if the wheel is loaded if the grains are blunt and if the gap between the wheel and the truing electrode is reduced. Thus the tool's cutting capacity is brought back to normal.

The objects of the present invention are further attained by providing a device for effecting the aforesaid grinding method. The device comprises a pulsed voltage source having poles connected through contact elements to a work, a tool and a tool truing electrode. The device further includes a nozzle to direct a liquid medium to the machining zone. According to the invention, the tool truing electrode and the work are connected to the same pole of the power source.

As a result, it is possible to use a single voltage source for the electrode and the work, which considerably simplifies the design and brings down the price of the device.

According to an alternative embodiment of the device, the function of the tool truing electrode may be performed by the nozzle for driving a liquid medium to the machining zone. This makes for a much simpler design of the grinder as a whole.

BRIEF DESCRIPTION OF THE ATTACHED DRAWING

Other objects and advantages of the present invention will become more apparent from a consideration of the following detailed description of preferred emobodiments thereof, taken in conjunction with the accompanying drawing which is a schematic view of a device in accordance with the invention.

DETAILED DESCRIPTION OF THE INVENTION

Referring to the attached drawing, the device according to the invention comprises a power source 1 having a first pole connected to a current-conducting work 2 arranged on a table 3. The second pole of the power source 1 is connected to a current-conducting abrasive tool 4, the connection being effected via a current collector 5. The tool 4 is insulated from the grinding machine by an appropriate member, such as a faceplate 6.

The device further includes an electrode 8 intended for truing the tool 4. Like the tool, the electrode 8 is insulated from the grinding machine; it is connected to the same pole of the power source 1 as the work 2 and is pressed against the working surface of the tool 4 by a spring 9 or hydraulically. The force with which the electrode 8 is pressed against the tool 4 is selected so as to enable the electrode to slide over the surface of the tool. According to the invention, provision is also made for a nozzle 7 to direct a liquid medium to the machining and truing zones. The conductance of the liquid medium is selected in the range of $10^{-4}$ to $2 \cdot 10^{-2}$ ohm$^{-1} \cdot$cm$^{-1}$. The liquid medium is either a cutting fluid or a weak electrolyte.

The grinding method according to the invention is carried out, and the device according to the invention operates, as follows.

A liquid medium is supplied through the nozzle 7 to the grinding zone. The power source 1 is switched on, and low pulsed voltage is applied to the tool 4, the work 2 and the truing electrode 8. This voltage ranges from a minimum of 3 V to a maximum which is below the level required for a breakdown of the liquid medium between the tool 4 on one side and the work 2 and electrode 8 on the other side. The grinding and truing are carried out at a pulse duration of 0.5 to 10 msec and a pulse repetition frequency of 10 to 500 Hz.

Arc discharges continuously trim the tool 4 and lay bare its grains. Owing to the above-mentioned parameters of the voltage pulses no significant drop of output voltage occurs as the tool 4 is shorted against the work 2 through the chips. Thus grinding continues to be effective with high infeed rates and areas of contact between the tool 4 and work 2 as large as 8 to 10 cm$^2$. In the case of cutter grinding, for example, the infeed may reach 8 to 10 mm/min with a contact area of 1 cm$^2$. When the tool 4 is clean and its grains are laid bare, the current in the truing circuit is sharply reduced.

Low infeed rates account for small mechanical loads; in such cases the truing of the wheel 5 is unnecessary.

The function of the truing electrode 8 can be performed by the nozzle 7 which drives the liquid medium to the machining zone. If that be the case, the nozzle 7 is electrically insulated from the grinding machine, provided with a detachable headpiece and connected to the power source 1. If the intensity of cleaning and the opening of the grains of the tool 4 is sufficient in the zone of grinding the work 2, it is not necessary to true the tool 4. The machining is carried out in this case by applying voltage only to the work 2 and the tool 4, the electrode 8 not being used.

Given below is information on flat surface grinding of a hard-alloy work. The grinding is done by the peripheral portion of a straight 100% diamond wheel; the grain sizes are 125 to 160 microns; the work dimensions are 70×145×10 mm; the liquid medium is an aqueous solution comprising 0.3% of nitrite and 0.2% of triethanolamine; the power of the power source is 3-kilowatt with a peak voltage of 23 V; the pulse repetition frequency is 50 Hz; and the pulse duration is 1.3 msec.

The grinding conditions are as follows: longitudinal feed, 10 to 12 m per minute; infeed, 1.5 m/per cutting stroke; and cutting depth, 0.05 mm per pass. The truing electrode 8 is a bar of gray iron with a section of 16×16 mm; it is spring-loaded so as to be pressed against the working surface of the tool 4. The negative terminal of the power source 1 is connected to the work 2 and truing electrode 8; the positive terminal is connected to the tool 4. As the grinding machine is started and the power source 1 is switched on, the current in the grinding circuit is as high as 6A; the current in the truing circuit is maintained at a level of 2 A with the aid of the resistors 2 and 9. When grinding works of hard tungsten-cobalt alloys, the rate of stock removal is 650 mm$^3$/min; the relative tool wear is 1.2 mg/g; and the surface roughness after the grinding is 0.32 micron. The drive of the tool 4 operates at a stable level of 1.5 kw.

The conventional grinding method carried out under identical conditions gives a tool wear of 1.1 mg/g at a rate of stock removal not exceeding 420 mm$^3$/min.

The method and device according to the invention account for a maximum stock removal of 2,000 mm$^3$/min for tungsten-cobalt alloys; the tool wear is 1.3 mg/g. The conventional grinding method shows a mere 1,000 mm$^3$/min and 1.2 mg/g, respectively. When using the conventional grinding method, the tool 4 lasts only for 25 minutes of heavy-duty operation. The method according to the invention makes the tool life as long as 380 minutes with the tool operating under the same heavy-duty conditions.

The use of the method and device of the present invention makes it possible to considerably intensify the grinding process.

The method of this invention is applicable at any shop where the grinding of hard-to-work materials is part of the daily routine.

What is claimed is:

1. A method for machining works of a current-conducting material with current-conducting abrasive tools in a liquid medium with a conductance of $10^{-4}$ to $2 \cdot 10^{-2}$ ohm$^{-1}$·cm$^{-1}$, whereby voltage pulses are applied to the tool and the work, the improvement residing in that the working is carried out with a pulse duration of 0.5 to 10 msec, a pulse repetition frequency of 10 to 500 Hz and an amplitude of pulses ranging from a minimum of 3 V to a maximum which is below a level required for a breakdown of the liquid medium between the tool and the work.

2. A method as claimed in claim 1, wherein simultaneously with machining a work electro-erosion truing of the tool outside the machining zone by means of an electrode is performed, voltage pulses being applied to the electrode with an amplitude ranging from a minimum of 3 V to a maximum which is below a level required for a breakdown of the liquid medium between the tool and the work, a pulse duration of 0.5 to 10 msec, and a pulse repetition of 10 to 500 Hz.

* * * * *